US008982185B1

(12) United States Patent (10) Patent No.: US 8,982,185 B1
Shastri et al. (45) Date of Patent: Mar. 17, 2015

(54) SYSTEMS AND METHODS FOR 2D-TO-3D CONVERSION

(75) Inventors: Vijnan Shastri, Palo Alto, CA (US); Jonathan Huang, Santa Clara, CA (US); Sam Kvaalen, San Francisco, CA (US); Debargha Mukherjee, Sunnyvale, CA (US); Chen Wu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 460 days.

(21) Appl. No.: 13/408,960

(22) Filed: Feb. 29, 2012

(51) Int. Cl.
*H04N 13/00* (2006.01)
*H04N 15/00* (2006.01)

(52) U.S. Cl.
USPC .............................................. 348/43; 348/50

(58) Field of Classification Search
USPC .................... 348/43, 51, 46, 50, 586, 49, 54; 382/154, 260
See application file for complete search history.

(56) References Cited

U.S. PATENT DOCUMENTS

| | | | | |
|---|---|---|---|---|
| 2011/0069152 | A1* | 3/2011 | Wang et al. | 348/43 |
| 2011/0321091 | A1* | 12/2011 | Lee | 725/39 |
| 2012/0304109 | A1* | 11/2012 | Herberger et al. | 715/782 |
| 2013/0106837 | A1* | 5/2013 | Mukherjee et al. | 345/419 |
| 2013/0141536 | A1* | 6/2013 | Choe et al. | 348/43 |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

* cited by examiner

*Primary Examiner* — Behrooz Senfi
(74) *Attorney, Agent, or Firm* — Amin, Turocy & Watson, LLP

(57) ABSTRACT

Systems and methods can facilitate identifying 2D content in media that is suitable for conversion into 3D content, and converting the suitable 2D content into 3D content. The identifying can be based on quality criteria applied to the 2D content. For 2D content converted into 3D content, a user can be offered a choice between viewing the content in its original 2D form, or viewing the content in its converted, 3D form. The systems and methods can thereby provide users with greater choice of content and an enhanced viewing experience.

18 Claims, 11 Drawing Sheets

SYSTEMS AND METHODS FOR 2D-TO-3D CONVERSION

TECHNICAL FIELD

This application relates generally to systems and methods for media management, and more particularly to converting two-dimensional (2D) content in media to three-dimensional (3D) content.

BACKGROUND

The technology of image capture and presentation has seen many advances over time. Early still photography led eventually to motion pictures on film, then the development of semiconductors and computers made digital photography and video possible. The evolution of imaging technology has involved the effort to make two-dimensional images look three-dimensional, and thus more "real." As the effort has acquired digital tools, techniques have become sophisticated. Nowadays, digital 2D-to-3D conversion systems with specialized hardware and software exist; the systems may run in real-time to convert 2D image data to 3D image data.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

This specification relates to systems and methods for converting two-dimensional (2D) media content to three-dimensional (3D) media content. More specifically, the systems and methods can facilitate identifying 2D content in media that is suitable for conversion into 3D content, and converting the suitable 2D content into 3D content. The identifying can be based, for example, on quality criteria applied to the 2D content. For 2D content converted into 3D content, a user can be offered a choice between viewing the content in its original 2D form, or viewing the content in its converted, 3D form. The systems and methods, thus, can provide users with greater choice of content and an enhanced viewing experience.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
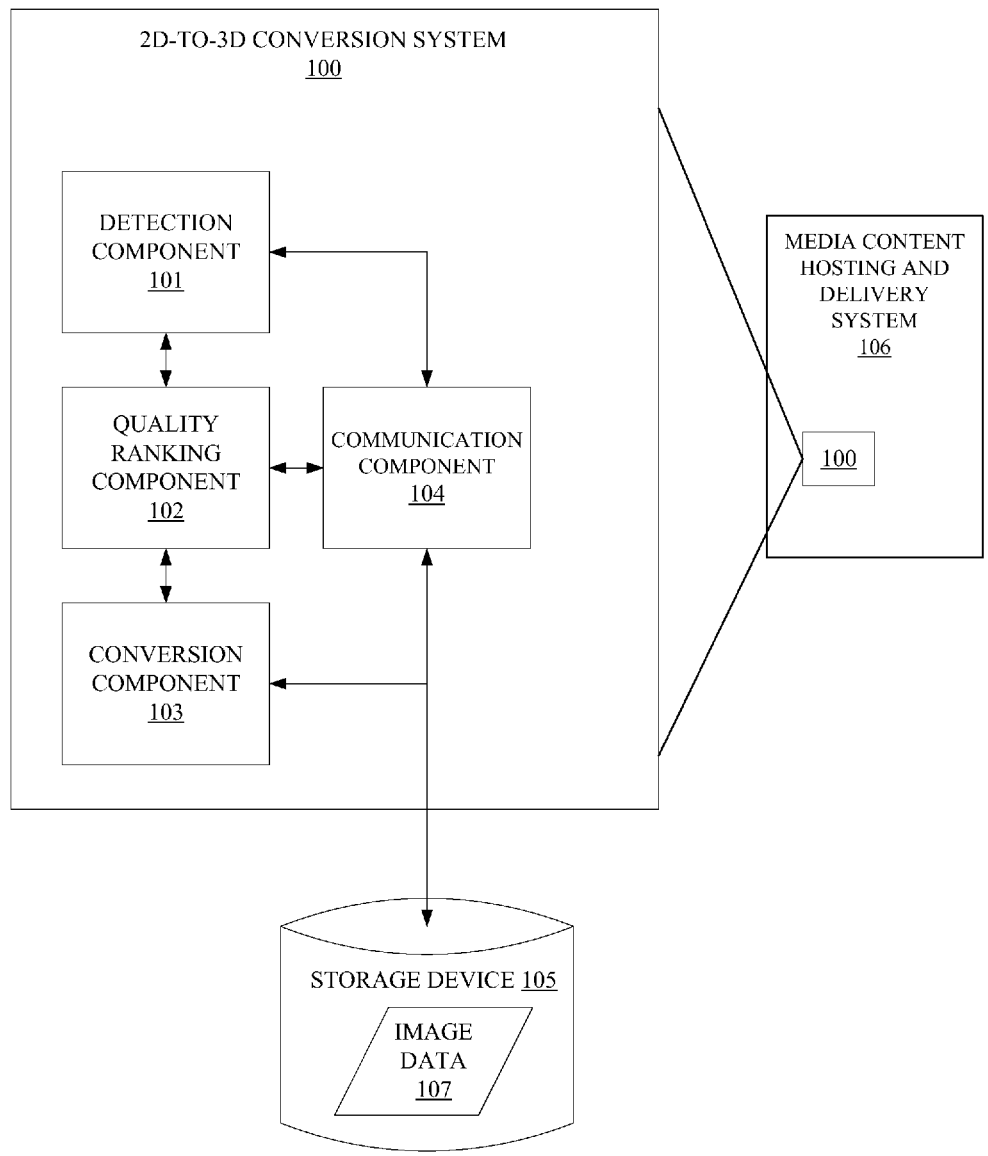
FIG. 1 illustrates a 2D-to-3D conversion system.

Embodiments of systems and methods for 2D-to-3D conversion can comprise a detection component, a quality ranking component and a conversion component. The detection component can analyze content, such as image data stored electronically in a file on a storage device, and determine whether the image data, or at least a portion of the image data, has a 2D format. The file may be a digital video file, for example. Based on the detection component determining that the file includes 2D image data, the quality ranking component can apply one or more criteria to the 2D data to test a quality of the 2D data. The criteria can relate to whether or not the 2D data is suitable for conversion to a 3D format. Based on the test, or a plurality of tests, the quality ranking component can assign a quality rank to the 2D data.

Based at least in part on the quality rank assigned to the 2D image data, the conversion component can convert, or determine not to convert, the 2D data into 3D image data. For example, if the quality rank is below a predetermined level, the conversion component can determine not to convert the 2D image data into 3D data. On the other hand, if the quality rank is at or above the predetermined level, the conversion component can convert the 2D image data into 3D image data.

The 3D image data resulting from the converted 2D image data can be stored on a storage device. The original 2D image data can be retained, for example in a copy stored on a storage device. A user can then retrieve and view the content in either its original 2D format, or in the 3D format resulting from the conversion. Thus, the systems and methods for 2D-to-3D conversion can provide consumers of digital image data with a wider range of options and a viewing experience that offers more "real-looking" images.

The above-outlined embodiments are now described in more detail with reference to the drawings, wherein like reference numerals are used to refer to like elements throughout. In the following description, for purposes of explanation, numerous specific details are set forth in order to provide a thorough understanding of the embodiments. It may be evident, however, that the embodiments can be practiced without these specific details. In other instances, well-known structures and devices are shown in block diagram form in order to facilitate describing the embodiments.

It should further be understood that the term "component" as used herein, and the variously-labeled component blocks as shown in the drawings, are not intended to suggest that a labeled component is necessarily discrete and separate from another labeled component. The labeled components can be dispersed or intermixed. Additionally, a particular label for a component, rather than indicating any limitation on its capabilities, should be understood as a categorization which generally describes one or a group of structures, capabilities, features or operations associated with the component. However, the structures, capabilities, features or operations may be shared with other components, or may cooperate with other components for combined effects.

Further, as discussed in more detail in the following, the components can be operative within a network, such as the Internet. Network implementations facilitating embodiments of the components are described in more detail further on, with reference to FIGS. 10 and 11.

Referring now to FIG. 1, a 2D-to-3D conversion system 100 can include a detection component 101, a quality ranking component 102 and a conversion component 103 that can communicate with one another. The detection component 101 can process (e.g., analyze, organize, classify, perform computations on, perform look-ups or searches on, quantify, correlate portions of internally or with external data, filter, parse, make inferences based on) image data to determine whether the image data has, or at least a portion of the image data has, a 2D format. The detection component 101 can further analyze the image data to determine whether the image data, or at least a portion of the image data has, a 3D format. Put in other terms, processing by the detection component 101 can determine whether image data has a 2D format and what portion or portions of the image data have a 2D format, and whether image data has a 3D format and what portion or portions of the image data have a 3D format.

A source of the image data processed by the detection component 101 can include content stored electronically, such as image data 107 stored on a storage device 105, and accessible via a network, such as the Internet or "Web." In embodiments, the 2D-to-3D conversion system 100 can interact with or be a component of a network-based media content hosting and delivery system 106, and access the image data 107 via mechanisms of, or in cooperation with, the media content hosting and delivery system 106. For example, a communication component 104 of the 2D-to-3D conversion system 100 can include mechanisms, or can utilize mechanisms of the media content hosting and delivery system 106, for accessing (e.g., reading, writing and storing) files associated with the media content hosting and delivery system 106. Thus, the image data 107 can, more particularly, be stored in a file on a client device (e.g., a user's personal computer) connected to the media content hosting and delivery system 106 via a network, and be uploaded to one or more servers of the media content hosting and delivery system 106 via, or in cooperation with, the communication component 104. The file stored on the user's device, more specifically, can be or include a digital video file, and the media content hosting and delivery system 106 can be or include a video hosting and delivery system.

User interactions referred to in the following can be implemented at least partly, via the communication component 104, with network-based mechanisms such as browsers. More specifically, a user can interact with the 2D-to-3D conversion system 100 and the media content hosting and delivery system 106 using, for example, a browser to supply input signals to an interface with the media content hosting and delivery system 106. In response to the signals, components of the 2D-to-3D conversion system 100 can interact with the media content hosting and delivery system 106 to effect operations described in the following. A user can be, for example, a registrant with or subscriber to the media content hosting and delivery system 106, or may simply be one casually navigating or "surfing" the Internet.

Still referring to FIG. 1, the quality ranking component 102 can, based on a determination by the detection component 101 that image data in a file contains 2D content, process the image data to assign a quality rank to the 2D content. The quality rank may relate to whether the 2D content is suitable for conversion to 3D data. "Suitable" in this context relates to objective criteria for measuring whether or not a result of converting the 2D image data to 3D image data is likely to be of a quality such that the resulting 3D image data is viewable, where the "viewable" aspect can also be based on objective criteria or metrics.

Figure 2:
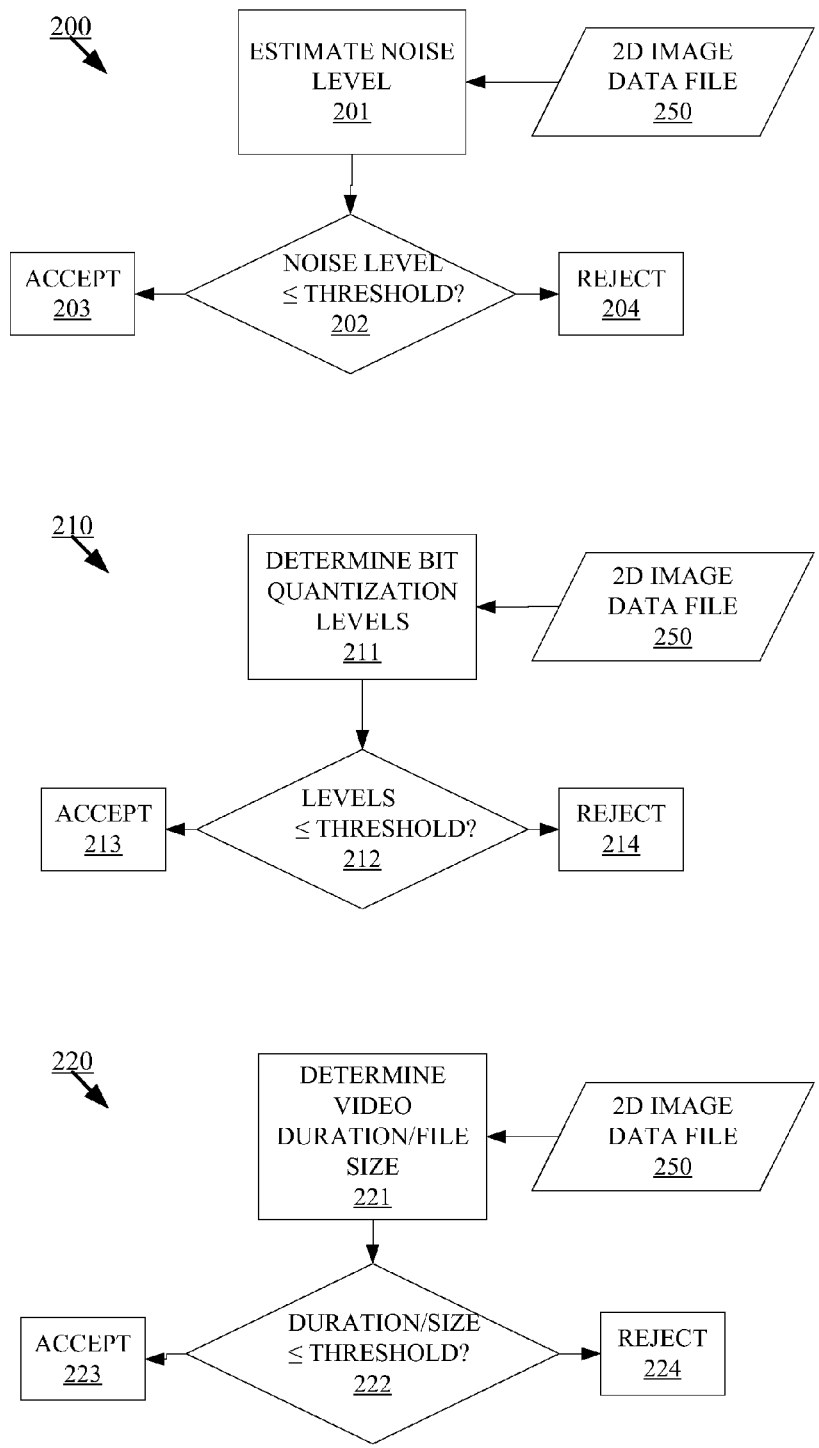
FIGS. 2-3 illustrate examples of methodologies in accordance with embodiments of the 2D-to-3D conversion system.

In embodiments, the quality ranking component 102 can include a plurality of objective tests for determining suitability for conversion. For example, the objective tests can be based on one or more of a noise level, a bit rate, a bit quantization, a resolution, a file size or duration, or a file format of 2D image data that is a candidate for conversion to a 3D format. Referring to FIG. 2, more detailed examples are illustrated as methodologies 200, 210 and 220. As shown in methodology 200, at 201 a 2D image data input file 250 can be processed (e.g., by a quality ranking component) to estimate a noise level in the input file 250. At 202, based on the estimating, an objective criterion such as whether the noise level is at or below a predetermined threshold, say, $T_N$, can be applied (e.g., by the quality ranking component). At 203, if the noise level is at or below the predetermined threshold $T_N$, a notification indicating that the file 250 is suitable for conversion to a 3D format can be generated (e.g., by the quality ranking component). At 204, on the other hand, if the noise level is above the predetermined threshold $T_N$, a notification indicating that the file 250 is rejected (e.g., not suitable for conversion to a 3D format), can be generated (e.g., by the quality ranking component).

Similarly, as shown in methodology 210, at 211 a 2D image data input file 250 can be processed (e.g., by the quality ranking component) to determine a bit quantization level in the input file 250. At 212, based on the determining, an objective criterion such as whether the bit quantization levels are at or below a predetermined threshold, say, $T_Q$, can be applied (e.g., by the quality ranking component). At 213, if the bit quantization levels are at or below a predetermined threshold $T_Q$, a notification indicating that the file 250 is suitable for conversion to a 3D format can be generated (e.g., by the quality ranking component). At 214, on the other hand, if the bit quantization levels are above the predetermined threshold $T_Q$, a notification indicating that the file 250 is rejected (e.g., not suitable for conversion to a 3D format) can be generated (e.g., by the quality ranking component).

As still another example, as shown in methodology 220, at 221 a 2D image data input file 250 can be processed (e.g. by the quality ranking component) to determine a duration or file size of the input file 250. At 222, based on the determining, an objective criterion such as whether the duration or size is at or below a predetermined threshold, say, $T_S$, can be applied (e.g., by the quality ranking component). At 223, if the duration or size is at or below a predetermined threshold $T_S$, a notification indicating that the file 350 is suitable for conversion to a 3D format can be generated (e.g., by the quality ranking component). At 224, on the other hand, if the duration or file size is above the predetermined threshold $T_S$, a notification indicating that the file 250 is rejected (e.g., not suitable for conversion to a 3D format) can be generated (e.g., by the quality ranking component).

Figure 3:
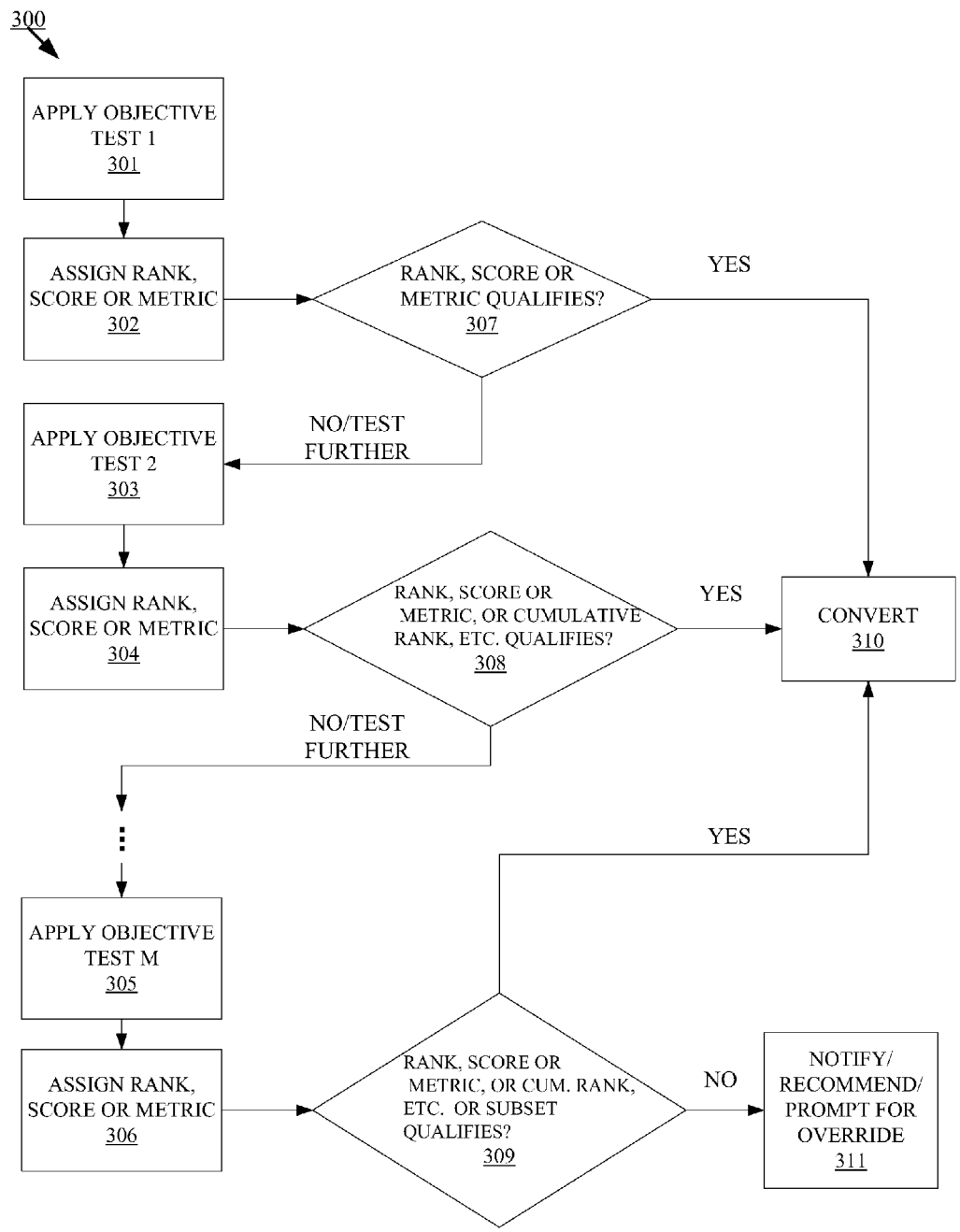

It should be understood that the example methodologies shown in FIG. 2 are not exclusive of one another. One or more of the illustrated methodologies, or other similar methodologies, could be applied to the same input file before a determination was made to accept or reject the file. Moreover, as noted previously, a rank can be assigned (e.g., by the quality ranking component) rather than a binary "accept or reject" determination made, with regard to a candidate 2D image data input file 250. A corresponding methodology 300 is shown in FIG. 3. As shown in FIG. 3, at 301, a first objective test ("test 1", e.g., a noise level test) can be applied to a candidate image data file (e.g. by the quality ranking component). The candidate image data file can be or include, for example, a video file uploaded to the media content hosting and delivery system 106, accessed via the communication component 104 (e.g., to obtain all or part of its content), and determined (e.g., by a detection component) to contain 2D image data. At 302, based on the application of the first objective test, a rank, or score or metric, corresponding to a quality measure indicated by the first objective test can be assigned (e.g., by the quality ranking component) to the candidate image data file. At 307, it can further be determined (e.g., by the quality ranking component) whether the rank, score or metric qualifies the candidate image data file for conversion to 3D. If so, at 310 the candidate image data file can be converted (e.g., by a conversion component) to a 3D format.

On the other hand, a determination whether to accept or reject a file need not be based on only one objective test. Instead, at 303, a second objective test ("test 2", e.g., a resolution test) can be applied (e.g., by the quality ranking component) to the candidate image data file. At 304, based on the application of the second objective test, a second rank, or score or metric, corresponding to a quality measure indicated by the second objective test, can be assigned (e.g., by the quality ranking component) to the candidate image data file. At 308, it can then be determined (e.g., by the quality ranking component) whether the second rank, score or metric by itself qualifies the candidate image data file for conversion to 3D, or whether a cumulative or combined rank representing results of both the first and second test, or some other function of the results of the first and second tests, qualifies the candidate image data file for conversion to 3D. If so, at 310 the candidate image data file can be converted (e.g., by the conversion component) to a 3D format.

At 305 and 306, a third, a fourth, and so on, up to an $M^{th}$ (M an integer) objective test can be applied (e.g., by the quality ranking component) to the candidate image data file. At 309, it can be determined (e.g., by the quality ranking component) whether the candidate image data file is suitable for conversion based on any single one or any subset or combination or function of the M tests. If ultimately it is concluded (e.g., by the quality ranking component) that the candidate image data file is not suitable for conversion, a notification to that effect, and a corresponding recommendation, can be generated (e.g., by the quality ranking component). For example, at 311 a recommendation can be generated (e.g., by the quality ranking component), based on the applied test(s), to, for example, execute an error correction process that might render the candidate image data file suitable for conversion. Further, at 311, a prompt for an "override" input, where the override input indicates that conversion is to be done even though the candidate image data file does not meet the objective criteria applied, can be issued (e.g., by the quality ranking component, or based on a determination by the quality ranking component, by the conversion component). The override feature is discussed in more detail further on.

Figure 4:
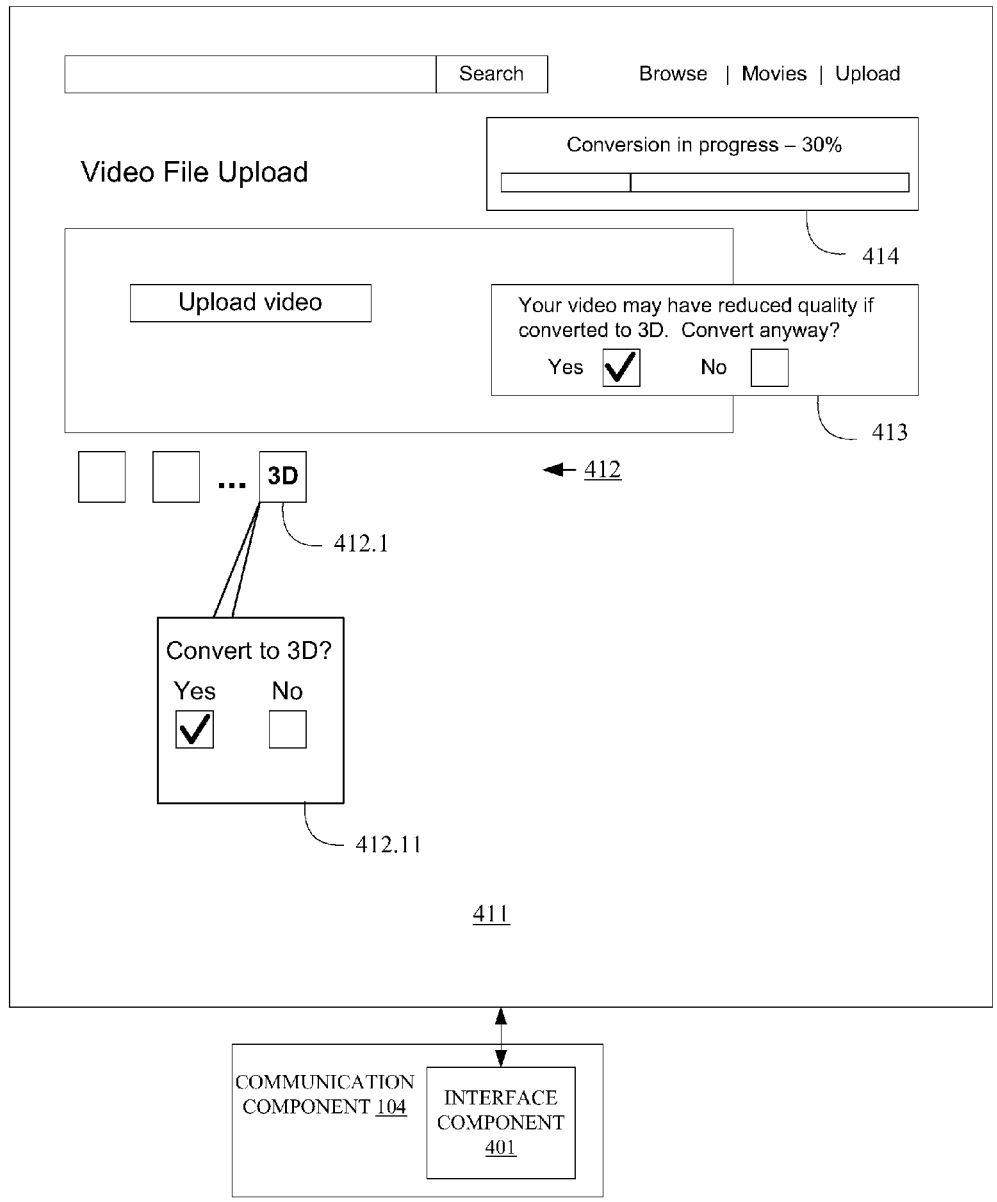
FIGS. 4 and 5 illustrates example of an interface component of the 2D-to-3D conversion system.

Referring to FIG. 4, the communication component 104 can further include an interface component 401. The interface component 401 can facilitate interaction with the media content hosting and delivery system 106 and user inputs. More specifically, the interface component 401 can cause to be presented or displayed, for example in a web page 411 of the media content hosting and delivery system 106 displayed on a client device, graphical elements for interacting with the media content hosting and delivery system 106 and user inputs. The graphical elements can be responsive to input signals received via a browser, for example. The interface component 401 can comprise at least a portion of, or can interact with, the web page 411 through controls 412. The controls 412 can be manipulated by input signals applied through an input device such as a mouse, a keyboard or a touch-screen. For example, by clicking on the controls 412 with a mouse, a user can upload a designated video to a storage device of the media content hosting and delivery system 106.

A "3D" input field or tab 412.1 can be included in the controls 502. The 3D tab 412.1 can be activated, e.g. touched or clicked on or moused-over, or otherwise interacted with, to generate an input signal. In embodiments, a graphical element such as a checkbox window 412.11 can be displayed in response to an interaction with the 3D tab 412.1, where the checkbox 412.11 can be responsive to an input confirming that 3D conversion should proceed (e.g. a mouse click in the "Yes" box) or indicating that 3D conversion should not proceed (e.g. a mouse click in the "No" box).

Based on an input signal indicating that 3D conversion should proceed, the 2D-to-3D conversion system 100 can perform operations as described in the foregoing. In more detail, the communication component 104 can access the video designated for uploading and provide image data in the video to the detection component 101. The detection component 101 can analyze the image data to determine whether the image data is in 2D format or 3D format. If the detection component 101 determines that the image data is in 3D format, the detection component 101 can, for example, generate a notification so reporting, such as, "This video is already in 3D format." A user could thereby be alerted, for example, that perhaps the user has designated the wrong video for conversion.

On the other hand, if the detection component 101 determines that the image data is in 2D format, the detection component 101 can communicate this determination to the quality ranking component 102. In response, the quality ranking component 102 can process the designated video to assign a quality rank to the 2D content, using operations described in the foregoing. Based on the quality rank, the quality ranking component 102 can determine whether the designated video is suitable for conversion. If the quality ranking component 102 determines that the designated video is not suitable for conversion, the quality ranking component 102 can generate a notification to this effect. In addition, quality ranking component 102 can provide an override option to proceed with the conversion notwithstanding, e.g., regardless of the quality rank assigned to the designated video. In response to the quality ranking component 102 determining that the designated video is suitable for conversion, or in response to an exercising of the override option, the conversion component 103 can proceed to convert the designated video to a 3D format.

Referring to FIG. 4, the override option can be represented by a graphical element 413 responsive to an input signal. The graphical element 413 can present a notification that, based on the quality rank assigned to the designated video, a determination has been made that the designated video is not suitable for conversion to 3D. Along with the notification, the option can be provided to proceed with the conversion anyway. For example, the notification can convey a message such as "Your video may have a reduced quality if converted to 3D. Convert anyway?" Input fields of the graphical element 413 can be responsive to an input confirming that 3D conversion should proceed anyway (e.g. a mouse click in the "Yes" box) or indicating that 3D conversion should not proceed (e.g. a mouse click in the "No" box). A status display, such as a progress window 414, can report a status of the conversion, including its completion. The designated video, once converted to 3D, can be stored on a storage device, such as disk storage of the media content hosting and delivery system 106, and thereafter retrieved for consumption, e.g., viewing. An uploaded copy of the designated video in its original, 2D format can also be stored on a storage device, such as disk storage of the media content hosting and delivery system 106, and thereafter retrieved for consumption, e.g., viewing.

Figure 5:
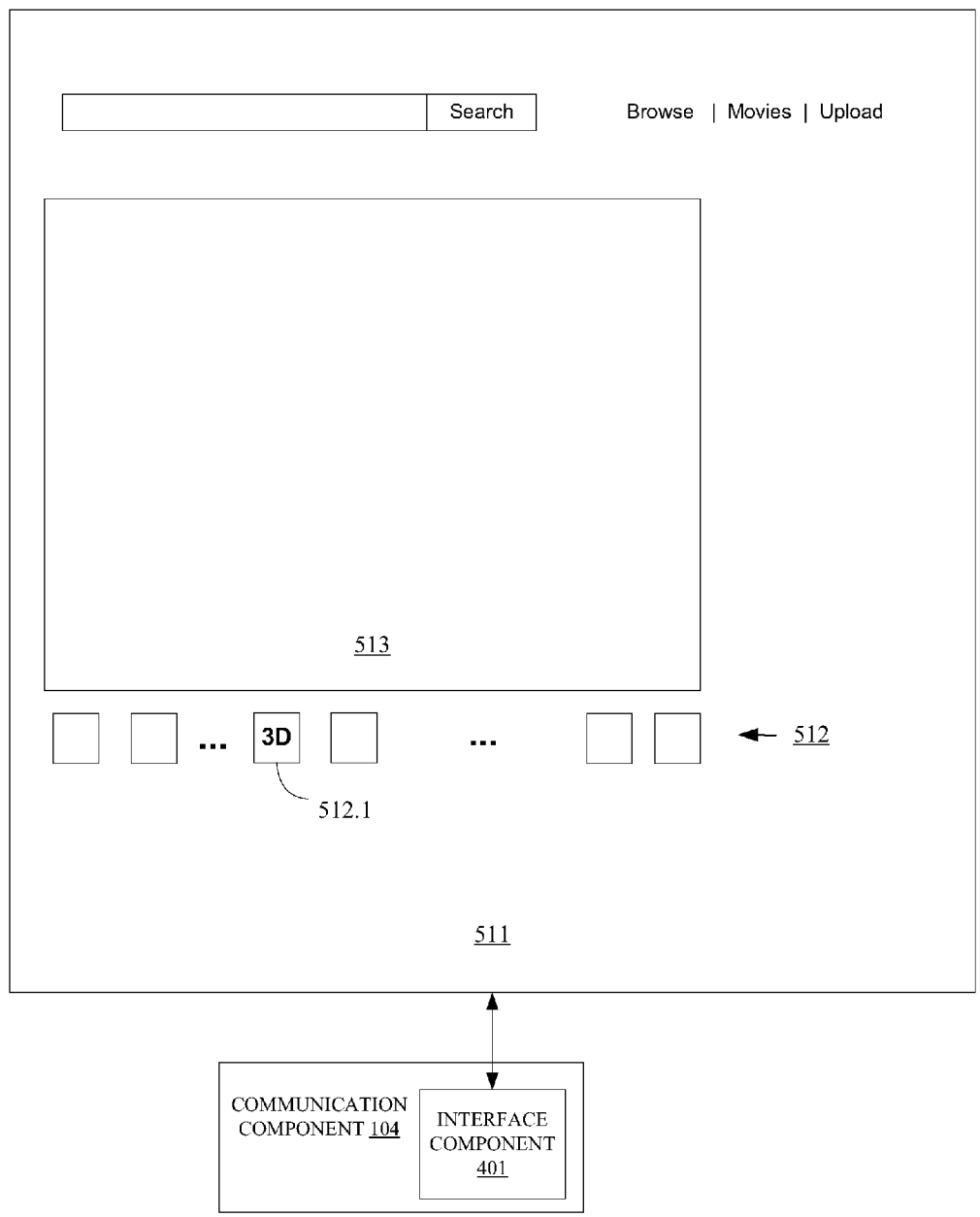

Referring now to FIG. 5, after the designated video is converted to 3D, the interface component 401 can interact with the media content hosting and delivery system 106 to provide an indication that the video is available for viewing in 3D format. For example, a web page 511 of the media content hosting and delivery system 106 can include a viewing window 513 and controls 512. A video can be selected for viewing in the viewing window 513. The interface component 401 can comprise at least a portion of, or can interact with, the web page 511 through controls 512. The controls 512 can include a graphical element 512.1 such as a 3D button or icon. The 3D icon can serve as a notification that a video selected for viewing was originally in a 2D format, but that a converted version of the original video is available in 3D format. In embodiments of the 2D-to-3D conversion system 100, a copy of the video in its original, 2D format can by default be retrieved and initially presented for viewing. However, in response to an input signal to the 3D icon 512.1, the converted, 3D version of the video can be retrieved and presented for viewing instead. Thus, as noted previously, the 2D-to-3D conversion system 100 can provide the option to users to view a video in either its original, 2D format, or in a converted, 3D format. In response to inputs indicating a selection of either choice of the option, embodiments of the 2D-to-3D conversion system 100, e.g., in cooperation with the media content hosting and delivery system 106, can cause transmission of a video stream in either 2D or 3D format to a consuming client device.

It should be understood that embodiments of an interface component 401 are not limited to the specific forms and examples illustrated in FIGS. 4 and 5. Rather, graphical elements corresponding to the interface component 401 and associated operations as described in connection with FIGS. 4 and 5 could take any of a practically unlimited number of forms, such as rectangles, circles, ellipses or other geometric shapes, icons, text and the like, along with associated visual effects such as color, blinking, movement and like, and along with audio effects such as beeps.

In embodiments of the 2D-to-3D conversion system 100, the capability to select viewing of a video in 3D, as represented by the 3D icon 512.1, can be made video-specific; e.g., the option can be provided to enable or disable the capability for each video on a per-video basis. Moreover, in switching a video between 2D and 3D formats, the underlying streams can be switched to preserve quality. Further, in embodiments of the 2D-to-3D conversion system 100, the capability to select viewing of a video in 3D can be provided, for users other than an uploader of the video, only if the uploader explicitly requested conversion of the video. In addition, settings associated with the video can be consistent between Flash and HTML5. Further, information can be provided to enable distinguishing a converted video from a 3D video that did not result from a conversion, e.g., a video that was always in 3D format. In some embodiments, a 3D format for videos presented for viewing may be the default, as opposed to a 2D format as the default.

Embodiments of the 2D-to-3D conversion system 100 can be utilized by a wide range of devices, including mobile devices. For example, the embodiments of the 2D-to-3D conversion system 100 can be utilized by a desktop computer, a laptop computer, a notebook computer, a cellular phone, a smartphone, a portable digital assistant (PDA), or any other device able to access a source of the 2D-to-3D conversion system 100 and media content, such as media content hosting and delivery system 106.

Figure 6:
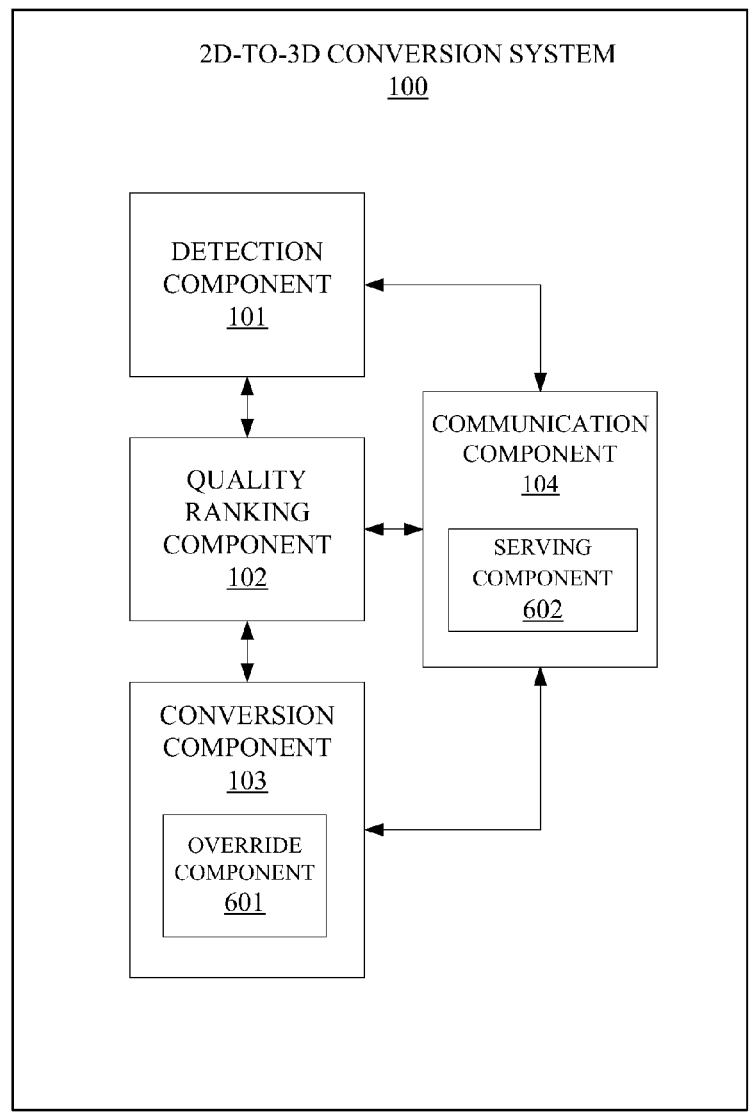
FIG. 6 illustrates additional details of components of the 2D-to-3D conversion system.

Referring now to FIG. 6, and in light of the foregoing discussion, further details of embodiments of the 2D-to-3D conversion system 100 are illustrated. As shown, the conversion component 103 can include an override component 601 that can communicate with the interface component 401 to provide the option to proceed with 2D-to-3D conversion notwithstanding that the quality ranking component 102 has assigned a rank that does not qualify the 2D image data in question for conversion, as discussed previously in connection with FIG. 4. Further, the communication component 104 can include a serving component 602 that communicates with the interface component 401 to provide the option to select viewing of a video in its original 2D format (e.g., by default or by toggling the 3D icon 512.1), or in its converted, 3D format (e.g., by selecting the 3D icon 512.1).

Figure 7:
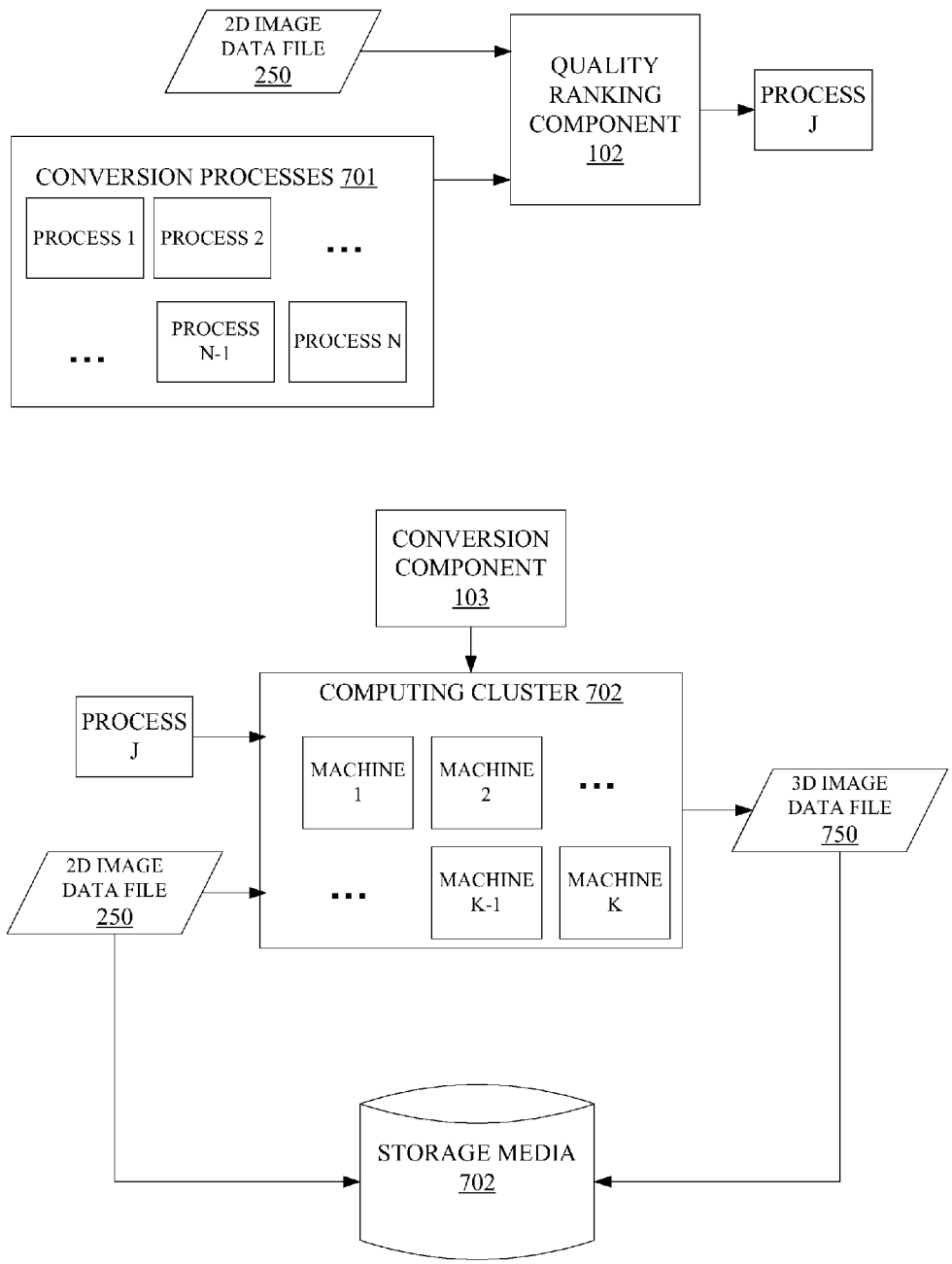
FIG. 7 illustrates examples of conversion processes and a computing cluster in accordance with embodiments of the 2D-to-3D conversion system.

Referring to FIG. 7, the quality ranking component 102 can further score conversion processes (e.g., algorithms). More specifically, a plurality of conversion processes 1-N(N an integer) 701 can be available. Each of the conversion processes can have properties making it more or less suitable, based on objective criteria, for application in any given conversion need or situation, and the quality ranking component 102 can evaluate, e.g., compare, results of one or more of the plurality of conversion processes to determine which one or ones to use to convert given 2D image data to 3D image data.

For example, referring to FIG. 7, a first process, process 1, can utilize color to determine the depth of a given object in 2D image data. Process 1 could therefore be less suitable than another process for conversion to 3D of 2D image data containing a large amount, or no amount, of the color red.

In contrast, a second process, process 2, can utilize motion detection to determine the depth of a given object in 2D image data. Process 2 could therefore be less suitable than another process for conversion of 2D image data containing a lot, or very little, motion. Similar properties (e.g., varying degrees of suitability depending on image data content) can be associated with each of the other processes 3-N.

Accordingly, the quality ranking component 102 can, for example, calculate an amount (e.g. a percentage) of red in an input 2D image data file 250 and, based on the calculated amount, assign a score to each of the plurality of processes 701 in terms of its suitability for application in converting the 2D image data file 250 to 3D. For example, if the amount of red was determined to be at or above a threshold $T_R$, the quality ranking component 102 could assign, say, process I the highest score, indicating that process I was likely to achieve a better conversion result, based on objective criteria, than the other processes. Similarly, the quality ranking component 102 can, for example, calculate an amount of movement in an input 2D image data file 250 (e.g., based on MPEG motion vectors) and, based on the calculated amount, assign a score to each of the plurality of processes 701 in terms of its suitability for application in converting the 2D image data file 250 to 3D. For example, if the amount of movement was determined to be at or above a threshold $T_M$, the quality ranking component 102 could assign, say, process J the highest score, indicating that process J was likely to achieve a better conversion result, based on objective criteria, than the other processes.

Still referring to FIG. 7, the quality ranking component 102 can identify a process, based on a comparison of a score assigned to the process to scores assigned to other processes, to the conversion component 103. The conversion component 103 can use the identified process, say, process J, to convert input 2D image data file 250 to an output 3D image data file 750. In embodiments, the conversion component 103 can utilize a computing cluster 702 comprising a plurality of computing machines 1-K (K an integer) in the conversion. Such a computing cluster 702 can achieve efficiencies when conversion processes are of high complexity. Accordingly, the quality ranking component 102 can further base a selection of a conversion process for utilization by the conversion component 103 on efficiency metrics based at least in part on a complexity, as measured by objective criteria, of a given conversion process.

The conversion can be done in "batch" processing, as opposed to real-time. As noted previously, both a copy of the 2D image data file 250 in its original 2D format, as well as a copy of the converted 3D image data file 750, can be electronically stored in one or more storage media 704, such as disk storage of one or more network servers of the media content hosting and delivery system 106, and retrieved for viewing.

Figure 8:
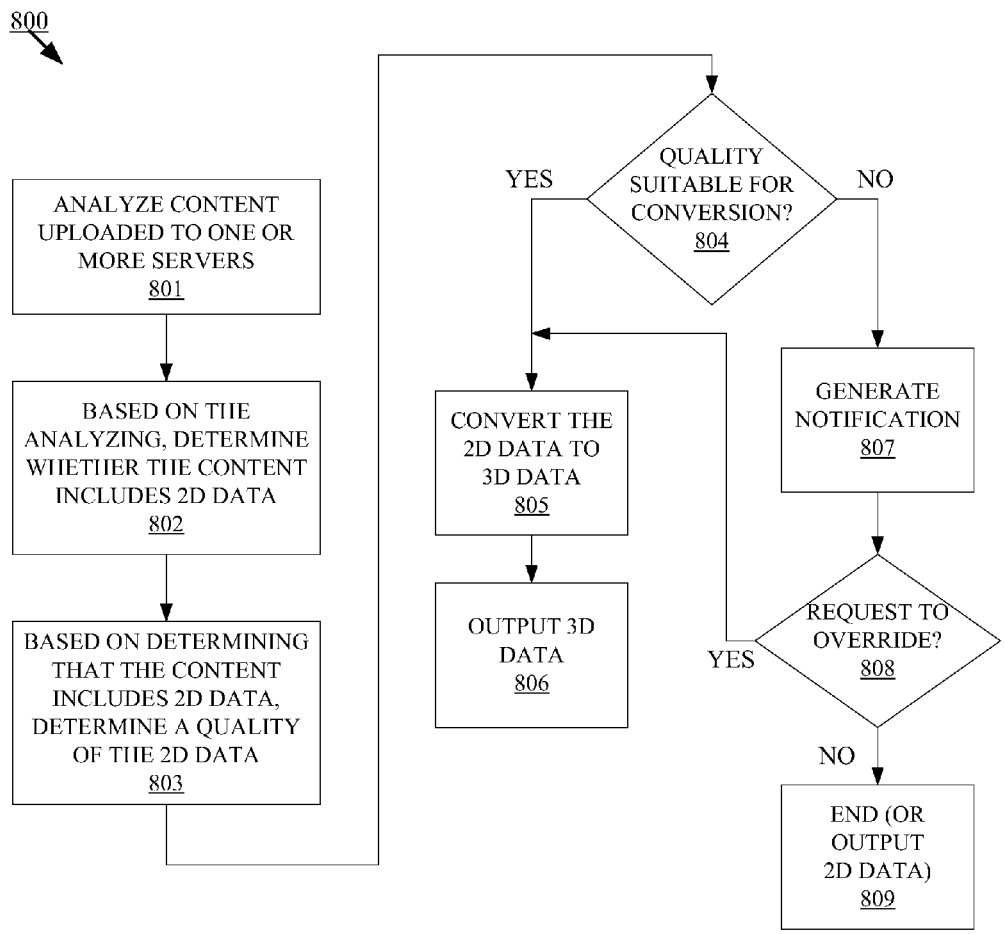
FIGS. 8 and 9 additional examples of methodologies in accordance with embodiments of the 2D-to-3D conversion system.
Figure 9:
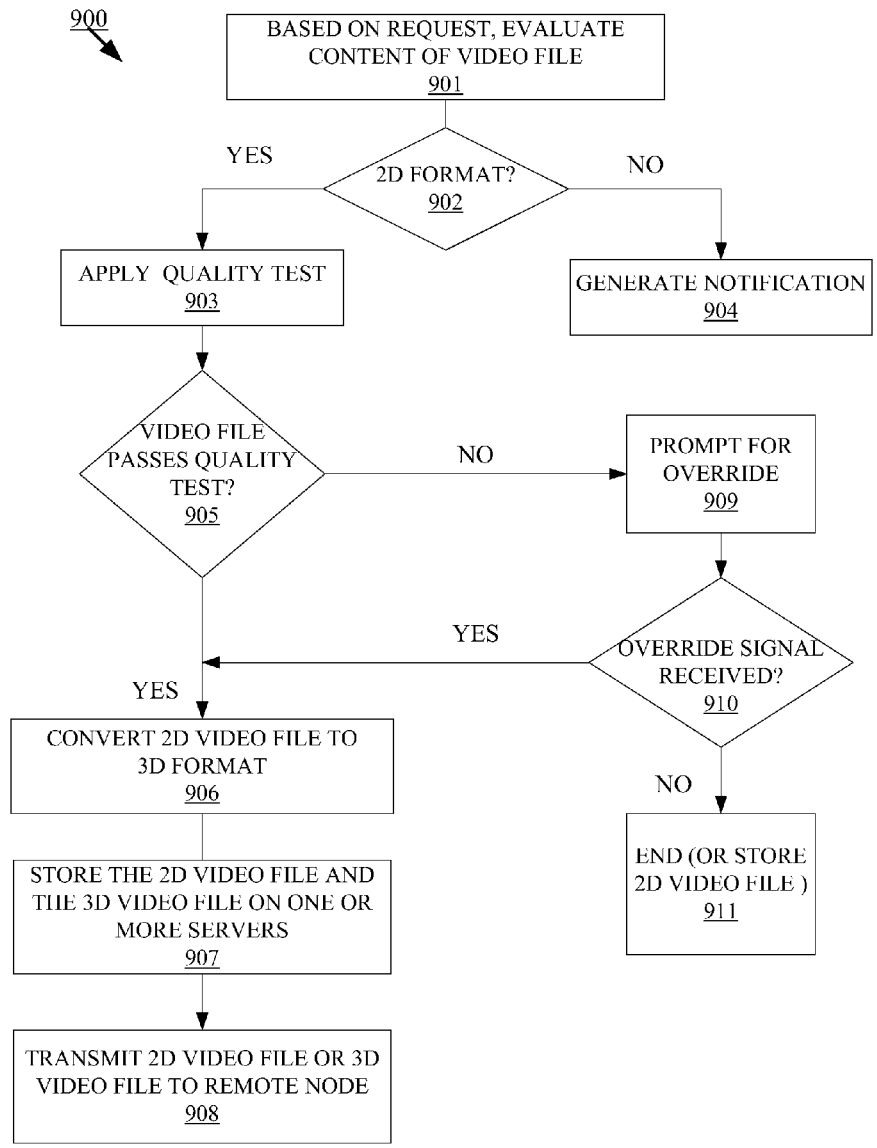

The discussion turns now to methodologies and/or flow diagrams in accordance with this disclosure. FIGS. 2 and 3 illustrate examples of such methodologies and have been discussed previously; FIGS. 8 and 9 illustrate further examples, to be discussed in more detail further on. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the methodologies described herein.

Referring now to FIG. 8, an example methodology 800 is illustrated that can be implemented by the 2D-to-3D conversion system 100 described in the foregoing. The methodology 800 can comprise, at 801, analyzing content (e.g., by a detection component) uploaded to one or more servers. The content can include, for example, a video uploaded from a client device to one or more servers of a media content hosting and delivery system. At 802, based on the analyzing, it can be determined (e.g., by the detection component) whether the content includes 2D image data.

At 803, based on determining that the content includes 2D image data, a quality of the 2D image data can be determined (e.g., by a quality ranking component). The determining of the quality can include applying one or more predetermined criteria to the 2D data, such as thresholds or results of tests relating to one or more of a noise level, a bit rate, a bit quantization, a resolution, a file size or duration, or a file format associated with the 2D image data. At 804-806, in response to determining that the 2D image data has a quality suitable for conversion to 3D image data ("YES" branch of 804), the 2D image data can be converted to 3D image data (805), and the 3D image data resulting from the conversion can be output and stored (806) (e.g., by a conversion component). The determining that the 2D image data has a quality suitable for conversion to 3D image data can include determining (e.g., by the quality ranking component) that the 2D image data meets one or more of the predetermined criteria.

At 804 ("NO" branch) and 807-809, in response to determining that the 2D image data does not have a quality suitable for conversion to 3D image data, a notification can be generated (807) (e.g., by the quality ranking component) that the 2D image data does not have a quality suitable for conversion to 3D image data, and a prompt can be issued (808) (e.g., by the conversion component) for an input indicating a request to proceed with the conversion anyway. At 808 ("YES" branch), in response to an input indicating a request to proceed with the conversion anyway, the operations corresponding to 805 and 806 described previously can be performed. At 808 ("NO" branch), in response to an input indicating a request not to proceed with the conversion, the methodology 800 can be ended, or the original 2D image data subject to the analyzing, etc., described previously can be output (809) for example uploaded and stored (e.g., by the conversion component or other output component).

Referring now to FIG. 9, another example methodology 900 is illustrated that can be implemented by the 2D-to-3D conversion system 100. The methodology 900 can comprise, at 901, based on a request, evaluating content of a video file to determine whether the video file is in a 2D format (e.g., by the detection component). At 902-904, based on determining that the video file is in a 2D format, a quality test can be applied (903) (e.g., by the quality ranking component) to the video file to determine whether the video file is suitable for converting to a 3D format, or based on a determination that the video file is not in a 2D format, a notification to that effect can be generated (904) (e.g., by the quality ranking component).

At 905 ("YES" branch), based on the video file passing the quality test, the video file can be converted (906) (e.g., by the conversion component) to the 3D format. At 907, the video file in the 2D format, and the converted video file in the 3D format, can be stored (e.g., by the conversion component) on one or more networked server computers. At 908, in response to one or more signals received from at least one remote node communicating with the one or more networked server computers (e.g., a client device being manipulated by a user), either the video file in the 2D format or the video file in the 3D format can be transmitted (e.g., by a communication component) for playback at the at least one remote node.

At 905 ("NO" branch), based on the video file failing the quality test, a prompt for an override signal indicating that the video file is to be converted to the 3D format notwithstanding the failing of the quality test can be issued (909) (e.g., by the conversion component. At 910 ("YES" branch), based on receiving the override signal, operations corresponding to 906-908 described previously can be performed, or, at 911, if the override signal is not received (e.g., if instead a signal indicating that the override prompt is declined) the methodology 900 can be ended or the 2D video file can be stored (e.g., by the conversion component or other output component).

Reference throughout this specification to "embodiments" means that a particular feature, structure, or characteristic described in connection with the embodiments is included in one or more embodiments. Thus, the appearances of the word "embodiments," or "in embodiments," in various places throughout this specification are not necessarily all referring to the same embodiments. Furthermore, the particular features, structures, or characteristics may be combined in any suitable manner in one or more embodiments.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 10:
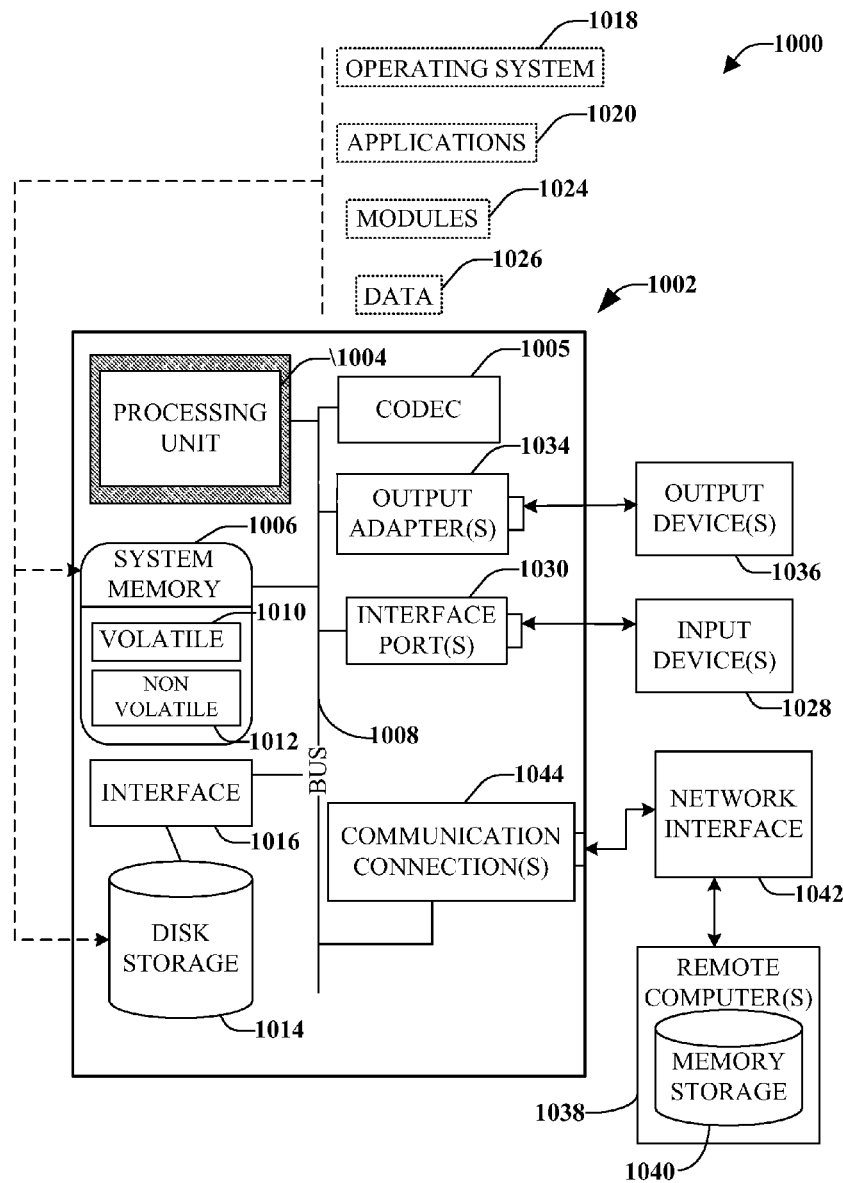
FIG. 10 illustrates an example schematic block diagram for a computing environment in accordance with the subject specification.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 10104), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapter 1034 includes, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the system bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
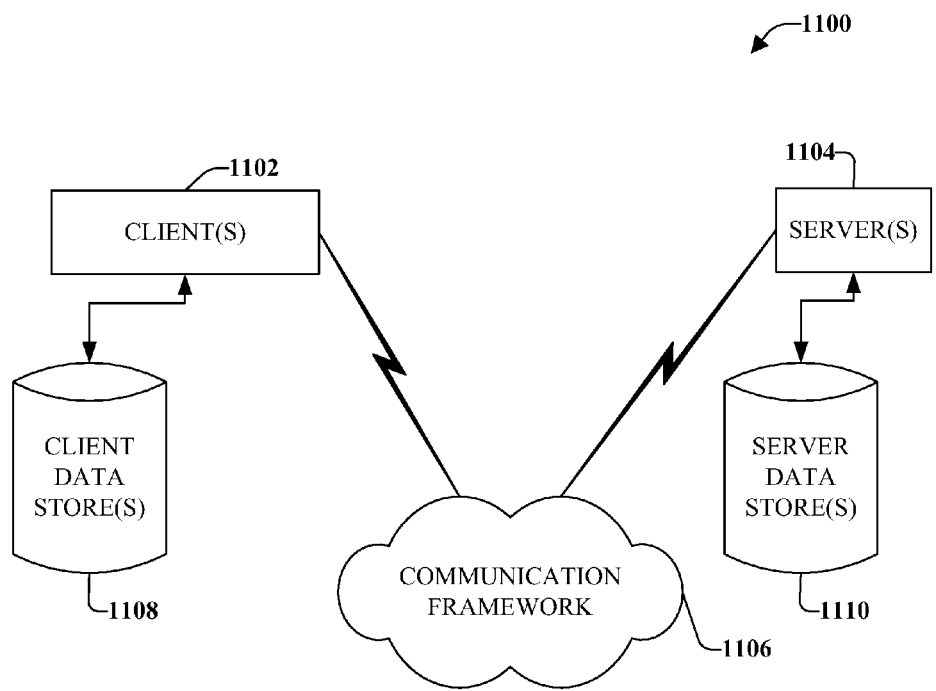
FIG. 11 illustrates an example block diagram of a computer operable to execute the disclosed embodiments.

Referring now to FIG. 11, there is illustrated a schematic block diagram of a computing environment (e.g., system) 1100 in accordance with the subject specification. The system 1100 includes one or more client(s) 1102, which can include an application or a system that accesses a service on the server(s) 1104. The client(s) 1102 can be hardware and/or software (e.g., threads, processes, computing devices). The client(s) 1102 can house cookie(s), metadata and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform, for example, interest point detection, distorting, merging, pruning, mixing, fingerprint generation, matching score generation, or fingerprint comparisons in accordance with the subject disclosure. One possible communication between a client 1102 and a server 1104 can be in the form of a data packet adapted to be transmitted between two or more computer processes where the data packet contains, for example, an audio sample. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1111 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methodologies for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system, comprising:
a processor; and
a memory communicatively coupled to the processor, the memory having stored therein computer-executable instructions, comprising:
   a detection component that identifies image data of two-dimensional (2D) format;
   a quality ranking component that tests a quality of the 2D image data and, based on the test, assigns a quality rank to the 2D image data, and scores a result of each of a plurality of processes for converting the 2D data to 3D format, and based on a comparison of respective result scores, selects at least one of the plurality of processes to employ to convert the 2D image data to 3D image data, wherein the plurality of processes includes at least one of a process that uses color to determine a depth of an object or a process that uses motion to determine the depth of an object; and
   a conversion component that converts the 2D image data to the 3D image data based at least in part on the assigned quality rank and the selected at least one process.

2. The system of claim 1, wherein the quality rank relates to whether the 2D image data is suitable for conversion to 3D image data.

3. The system of claim 1, wherein to test the quality of the 2D image data, the quality ranking component applies criteria relating to at least one of a noise level, a bit rate, a bit quantization, a resolution, a file size or duration, or a file format associated with the 2D image data.

4. The system of claim 2, further comprising an override component that, in response to a request, causes the conversion component to convert the 2D image data to 3D image data regardless of the quality rank assigned.

5. The system of claim 1, further comprising a serving component that, in response to a request, provides for viewing either of the 2D image data or the 3D image data.

6. The system of claim 1, wherein the conversion component uses a cluster of machines to convert the 2D image data to the 3D image data.

7. The system of claim 1, further comprising an interface component that presents, on a display device, at least one field responsive to an input signal, the at least one field including:
   a field that, in response to an input signal, causes the conversion component to convert the 2D image data to 3D image data.

8. The system of claim 5, further comprising an interface component that presents, on a display device, at least one field responsive to an input signal, the at least one field including:
   a field that indicates that content initially presented for viewing in 2D format is available in 3D format, and in response to an input signal, causes the serving component to provide the content in the 3D format.

9. A method, comprising:
analyzing, by a system including a processor, content uploaded to one or more networked servers;
based on the analyzing, determining, by the system, whether the content includes 2D image data;
in response to determining that the content includes 2D image data:
   determining, by the system, a quality of the 2D image data based upon predetermined criteria to the 2D image data;
   scoring, by the system, a result of each of a plurality of processes for converting the 2D data to 3D format; and
   based on a comparison of respective result scores, selecting, by the system, at least one of the plurality of processes to employ to convert the 2D image data to 3D image data, wherein the plurality of processes includes at least one of a process that uses color to determine a depth of an object or a process that uses motion to determine the depth of an object; and
   in response to determining that the quality of the 2D image data meets the predetermined criteria, converting, by the system, the 2D image data to the 3D image data using the selected at least one process.

10. The method of claim 9, wherein the predetermined criteria comprises at least one of a noise level criterion, a bit rate criterion, a bit quantization criterion, a resolution criterion, a file size or duration criterion, or a file format criterion.

11. The method of claim 9, wherein the converting employs a computing cluster including a plurality of machines.

12. The method of claim 9, further comprising:
based on determining that the quality of the 2D image data does not meet the predetermined criteria, generating, by the system, a notification that the quality of the 2D image data does not meet the predetermined criteria; and
in response to a request for conversion of the 2D image data notwithstanding the notification, converting, by the system, the 2D image data not meeting the predetermined criteria to the 3D image data.

13. The method of claim 9, further comprising, in response to a request, providing, by the system, either of the 2D image data or the 3D image data for consumption.

14. The method of claim 13, further comprising providing, by the system, a notification that the 3D image data was originally 2D image data.

15. The method of claim 9, further comprising transmitting, by the system, the 3D image data in a video stream to a mobile device.

16. A non-transitory computer-readable medium having instructions stored thereon that, in response to execution, cause a system including a processor to perform operations comprising:
evaluating content of a video file to determine whether the video file is in a 2D format;
in response to determining that the video file is in a 2D format, applying a quality test to the video file to determine whether the video file is suitable for converting to a 3D format;
in response to the video file passing the quality test:
   scoring a result of each of a plurality of processes for converting the 2D data to 3D format;
   based on a comparison of respective result scores, selecting at least one of the plurality of processes to employ to convert the 2D image data to 3D image data, wherein the plurality of processes includes at least one of a process that uses color to determine a depth of an object or a process that uses motion to determine the depth of an object; and
   converting the video file to the 3D format.

17. The non-transitory computer-readable medium of claim 16, the operations further including:
in response to the video file failing the quality test, prompting for an override signal indicating that the video file is to be converted to the 3D format notwithstanding the failing of the quality test; and in response to receiving the override signal, converting the video file to the 3D format.

18. The non-transitory computer-readable medium of claim 16, the operations further including:

in response to one or more signals received from at least one remote node, transmitting either the video file in the 2D format or the video file in the 3D format for playback at the at least one remote node.

* * * * *